(12) United States Patent
Chen et al.

(10) Patent No.: US 7,929,535 B2
(45) Date of Patent: Apr. 19, 2011

(54) GEOLOCATION-BASED ADDRESSING METHOD FOR IPV6 ADDRESSES

(75) Inventors: Liren Chen, San Diego, CA (US); Jack Steenstra, San Diego, CA (US); Kirk S. Taylor, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 556 days.

(21) Appl. No.: 11/482,451

(22) Filed: Jul. 7, 2006

(65) Prior Publication Data

US 2008/0008179 A1     Jan. 10, 2008

(51) Int. Cl.
  *H04L 12/56* (2006.01)
(52) U.S. Cl. ........ 370/392; 370/401; 370/349; 709/217; 709/238; 709/245
(58) Field of Classification Search ............ 370/349, 370/329, 392, 395.5; 709/217, 238, 227, 709/245; 701/35, 213, 215; 702/159, 188–189; 379/45; 714/53
See application file for complete search history.

(56) References Cited

U.S. PATENT DOCUMENTS

| | | | | |
|---|---|---|---|---|
| 5,919,239 | A * | 7/1999 | Fraker et al. ............... | 701/35 |
| 6,236,652 | B1 * | 5/2001 | Preston et al. ............. | 370/349 |
| 6,477,581 | B1 * | 11/2002 | Carpenter et al. .......... | 709/238 |
| 6,665,611 | B1 * | 12/2003 | Oran et al. ................. | 701/213 |
| 6,804,624 | B2 * | 10/2004 | Silverman ................. | 702/159 |
| 6,829,230 | B1 | 12/2004 | Tiuri | |
| 6,895,461 | B1 * | 5/2005 | Thompson ................. | 710/305 |
| 7,246,272 | B2 * | 7/2007 | Cabezas et al. ............ | 714/53 |
| 2005/0018645 | A1 * | 1/2005 | Mustonen et al. .......... | 370/349 |
| 2005/0018677 | A1 | 1/2005 | Lee | |
| 2005/0262218 | A1 * | 11/2005 | Cox et al. ................. | 709/217 |
| 2006/0212601 | A1 * | 9/2006 | Hampton .................. | 709/245 |
| 2008/0107243 | A1 * | 5/2008 | Terrill et al. .............. | 379/45 |

FOREIGN PATENT DOCUMENTS

| | | |
|---|---|---|
| GB | 2376604 | 12/2002 |
| WO | 02096041 A | 11/2002 |
| WO | WO 03/058898 | * 1/2003 |

OTHER PUBLICATIONS

International Search Report dated Jan. 16, 2008, serial No. PCT/US2007/072886, 4 pages.

(Continued)

*Primary Examiner* — Robert W Wilson
*Assistant Examiner* — Mohamed Kamara
(74) *Attorney, Agent, or Firm* — Turocy & Watson, LLP (57) ABSTRACT

One feature provides a method for encoding geolocation information into a next-generation internet protocol (IP) address, such as IPv6, to facilitate distribution of geolocation information among networked devices. A request for an IP address assignment is received from a network device. The geographical location for the network device is obtained. An IP address is assigned or generated that includes the geographical location. The assigned IP address is then provided to the network device. By encoding the geolocation information of a first network device into the IP address assigned to the first network device, other network devices are able to readily obtain the geographical location of the first network device. This method propagates geolocation information for network devices as part of the IP address, thus avoiding the need for separate geolocation distribution messaging. As the network device moves, its IP address is changed to update its geographical location information.

31 Claims, 7 Drawing Sheets

OTHER PUBLICATIONS

Hinden, et al. "IP Version 6 Addressing Architecture; rfc2373.txt" IETF Standard, Internet Engineering Task Force, IETF, CH, Jul. 1998, 25 pages.

European Office Action dated Oct. 5, 2009 for European Patent Application Serial No. 07840358.1, 5 pages.

European Office Action dated Jun. 25, 2010 for European Patent Application Serial No. 07840358.1, 5 pages.

Korean Office Action dated Oct. 7, 2010 for Korean Patent Application Serial No. 2009-7002303, 6 pages.

* cited by examiner

GEOLOCATION-BASED ADDRESSING METHOD FOR IPV6 ADDRESSES

BACKGROUND

1. Field

Various embodiments of the invention pertain to network devices, and more specifically to network infrastructure devices with knowledge of their own geographical location and a protocol that facilitates geolocation of other network devices.

2. Background

Finding the location of network-attached devices is often difficult, but is desired for many commercial, emergency and legal purposes. For example, voice-over-IP (VOIP) telephone communication services rely on knowing the geographical information of a telephone device to route emergency calls. An emergency call cannot be easily routed to a nearby call center without knowing the geographical location of the telephone device. In the event that the caller using a VOIP telephone is unable to provide an address, emergency services may be unable to locate the caller in another way. Regulations of telephone services also impose the need to locate a telephone device for emergency purposes. Similarly, other applications may benefit from knowing the current geographical location of a network-attached device.

Some approaches to geolocating a network-attached device rely on the device itself having geolocating capabilities to determine its own geographical location. Other approaches rely on the network infrastructure to determine a geographical position and report to another server or requesting device the results of the position determination.

Thus, a way is needed to facilitate geolocation determination and tracking for network devices on a communication network.

SUMMARY

A method is provided for assigning an IP address to a network device encoded with the geolocation information of the network device. A request for an IP address assignment is received from a network device. The geographical location for the network device is obtained and an IP address that includes the geographical location is assigned and provided to the requesting network device. The geographical location may be obtained by determining a distance from a network router having a known geographical location to the network device. Alternatively, the geographical location is obtained from one or more other infrastructure devices or from the requesting network device. In some implementations, the IP address requested is a 128-bit IPv6 address and may be assigned by encoding the geographical location into the IP address. The geographical location may include at least one of a latitude, longitude, or altitude. Additionally, a timestamp may be encoded as part of the IP address, the timestamp indicating the time in which the geographical location was obtained.

The method may further track a movement of the network device to obtain a new geographical location and update the IP address of the network device to reflect its new geographical location. In some embodiments, a Media Access Control (MAC) address of the network device into the IP address.

An apparatus is also provided comprising a network interface to couple the apparatus to a communication network and a processing circuit coupled to the communication interface. The processing unit is configured to (1) receive a request for an IP address assignment from a network device through the network interface, (2) obtain a geographical location for the network device, (3) assign an IP address that includes the geographical location, and (4) provide the assigned IP address to the network device through the network interface.

Another implementation provides a machine-readable medium having one or more instructions for assigning an IP address having an encoded geographical location of a network device, which when executed by a processor causes the processor to: (1) receive a request for an IP address assignment from a network device, (2) obtain a geographical location for the network device, (3) assign an IP address that includes the geographical location, and (4) provide the assigned IP address to the network device.

Yet another feature provides a method for obtaining a geographical location for a network device from an IP address. The IP address of a network device is received and a geographical location is extracted from the IP address. The geographic location in the IP address is then associated with the network device.

An apparatus is also provided comprising: (1) a network interface to couple the apparatus to a communication network, and (2) a processing circuit coupled to the communication interface. The processing circuit may be configured to (1) receive an IP address of a network device, (2) extract a geographical location from the IP address, and (3) associate the geographic location in the IP address with the network device.

Another feature provides an apparatus having capabilities to self-assign an IP address encoded with geolocation information and propagate that address to other network devices. The network device may comprise: (1) a network interface to couple the network device to a communication network, (2) a geolocation interface that provides a geographical location for the network device, and (3) a processing circuit coupled to the communication interface and geolocation interface. The processing circuit may be configured to (1) obtain the geographical location for the network device from the geolocation interface, (2) generate an IP address for the network device that includes the geographical location of the network device, and (3) propagate the IP address of the network device to other network devices via the network interface.

DETAILED DESCRIPTION

In the following description, specific details are given to provide a thorough understanding of the embodiments. However, it will be understood by one of ordinary skill in the art that the embodiments may be practiced without these specific details. For example, circuits may not be shown in block diagrams in order not to obscure the embodiments in unnecessary detail.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to portable or fixed storage devices, optical storage devices, wireless channels, and various other mediums capable of storing, containing, or carrying instruction(s) and/or data.

Furthermore, embodiments may be implemented by hardware, software, firmware, middleware, microcode, or a combination thereof. When implemented in software, firmware, middleware, or microcode, the program code or code segments to perform the necessary tasks may be stored in a machine-readable medium such as a storage medium or other storage means. A processor may perform the necessary tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, and the like, may be passed, forwarded, or transmitted via a suitable means including memory sharing, message passing, token passing, and network transmission, among others.

One feature provides a method for encoding geolocation information into a next-generation internet protocol (IP) address, such as IPv6, to facilitate distribution of geolocation information among networked devices. By encoding the geolocation information of a first network device into the IP address assigned to the first network device, other network devices are able to readily obtain the geographical location of the first network device. This method propagates geolocation information for network devices as part of the IP address, thus avoiding the need for separate geolocation distribution messaging, or the need for a discovery process to determine the geolocation of a network device.

Another feature provides for updating the IP address of a network device to reflect a change in geographical location or movement of the network device. That is, as a network device moves from one location or region to another, its IP address is changed to reflect this change in geographical locations.

IPv6 is a next-generation IP addressing scheme that increases the IP address length to 128 bits from the 32 bits used in IPv4. IPv6 addresses are represented as eight (8), sixteen bit integers in hexadecimal format (e.g., X:X:X:X:X:X:X:X, where each X represents a 16 bit integer). The IPv6 address is typically divided into a Network ID segment and a Host ID segment. For example, for the IPv6 address N:N:N:N:H:H:H:H, the N:N:N:N integers (64 bits) represent a Network ID while the H:H:H:H integers (64 bits) represent a Host ID. One implementation uses the Network ID integers to encode the geographical location of network devices. The 64-bit Network ID may represent $2^{64}$ ($18.446 \times 10^{18}$) distinct values. Other implementations may instead use the Host ID segment, or a combination of the Network ID and Host ID, of an IPv6 address to encode the geographical location of network devices. The choice of which segments or bits within an IPv6 address are used for encoding geographical location information may depend on the availability of addresses among other factors. For instance, in one implementation, the Network ID 010xxxxxxxxxxxxxx:N:N:N (where x represents one bit and N represents a 16 bit integer and is typically written as a 1 to 4 hexadecimal digit string, e.g X=0 or A1 or CA09 where leading zeros are omitted) may be reserved for geolocation-specific applications, thereby providing up to sixty-one (61) bits to encode geographical locations. Alternatively, other segments or bits of the Network ID and/or Host ID may be reserved for this purpose.

Figure 1:
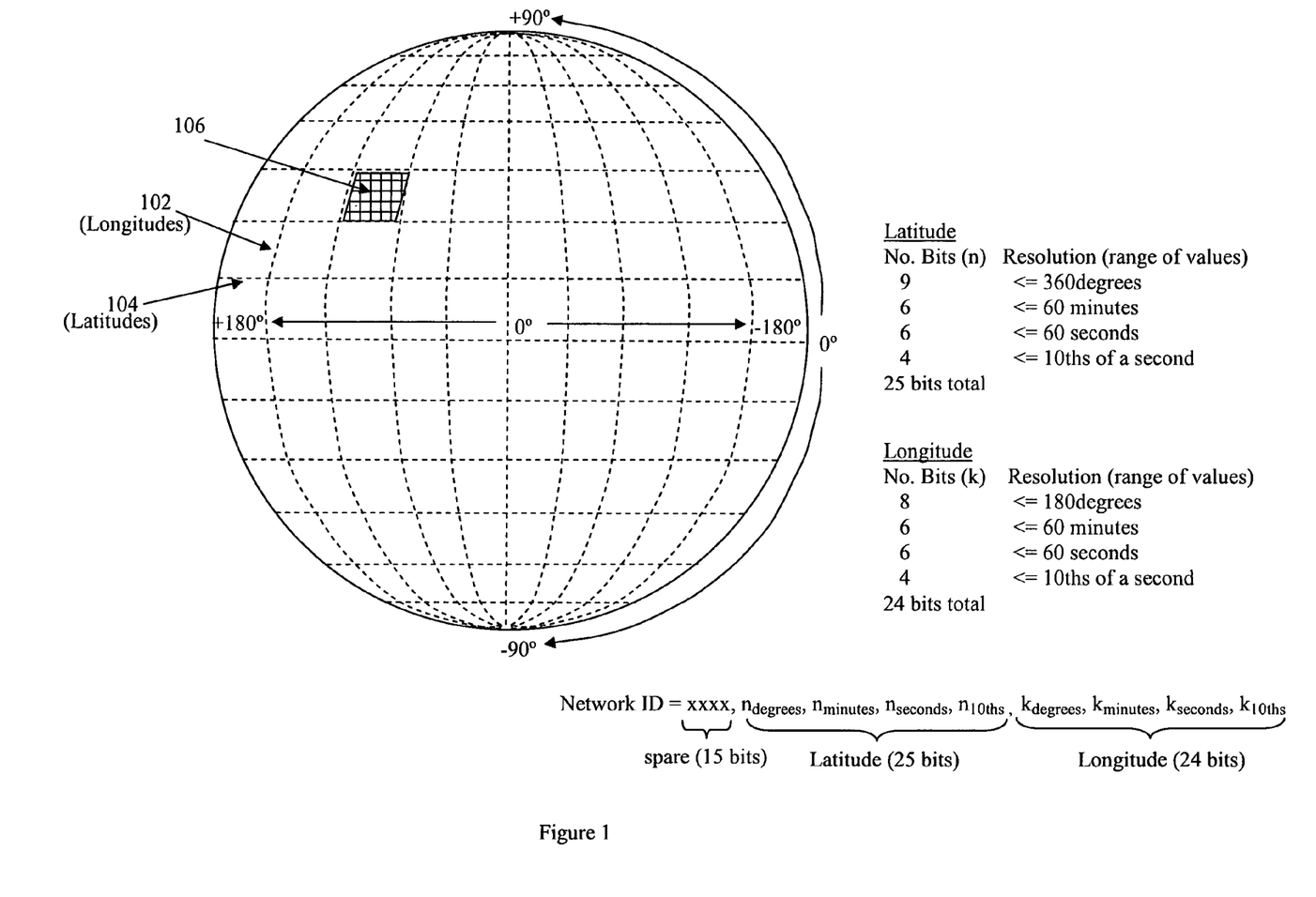
FIG. 1 illustrates how the planet Earth may be divided into regions based on latitudes and longitudes to encode geolocation information into an IPv6 address.

FIG. 1 illustrates how the planet Earth may be divided into regions based on latitudes, longitudes, and/or altitudes to encode geolocation information into an IPv6 address. Geographical locations may be represented in terms of global coordinates, such as longitudes 102 and latitudes 104. Latitudes 104 are horizontal mapping lines that run parallel to Earth's equator and are represented in degrees, minutes (') and seconds (") from plus ninety (+90°) degrees to minus ninety (−90°) degrees. Longitudes 102 are mapping lines on Earth that are vertically positioned with one end at the North Pole and the other at the South Pole, each having degrees, minutes, and seconds from +180° degrees to −180° degrees. Degrees of latitude and longitude are divided into minutes and seconds. There are sixty (60) minutes in each degree, and sixty (60) seconds in each minute. Seconds may be further divided into tenths, hundredths, or even thousandths. Every location on Earth, to the resolution of seconds, can be represented as latitude (e.g., 360°×60'×60") by longitude (e.g., 180°×60'×60") or $8.398 \times 10^{11}$ distinct values. Such resolution of seconds provides geographical locations to within approximately one hundred feet (at the equator) or less. Note that the distance for longitude per degree decreases from the equator to the polar point, potentially increasing the attainable resolution as geographical locations approach the poles. Greater accuracy may also be attained by using smaller units of resolution. For example, using a resolution of tenths of a second would take approximately $8.398 \times 10^{13}$ distinct values and provide an accuracy of approximately ten feet or less.

In addition to longitude and latitude information, one feature also provides altitude location within an IPv6 address. This permits to distinguish between locations within a multi-story building, for example. In various implementations, altitude may be represented as a distance above/below sea level or as a distance above/below ground level.

Because a 64-bit Network ID segment of an IPv6 address provides up to $18.446 \times 10^{18}$ distinct values, this segment is sufficiently large to accommodate $8.398 \times 10^{13}$ combinations of distinct latitude and longitude values (using tenths of a second resolution).

The geographical location of a network device anywhere on Earth may be encoded and/or be part of its IP address. For example, the 64-bit Network ID segment of an IPv6 address may include latitude, longitude, and altitude information for a network device. As illustrated in FIG. 1, the latitude may be represented using 25 bits (e.g., 9 bits for degrees, 6 bits for minutes, 6 bits for seconds, and 4 bits for tenths of seconds). Similarly, the longitude maybe represented using 24 bits (e.g., 8 bits for degrees, 6 bits for minutes, 6 bits for seconds, and 4 bits for tenths of seconds). Alternatively, latitude information may be represented in decimal format in tenths of a second by using only 24 bits instead of 25 bits. Similarly, longitude information may be represented in decimal format using 23 bits, thus saving one (1) bit. Thus, the 64-bit Network ID segment of an IPv6 address includes 49 bits for geolocation information with 15 extra bits to spare. Alternatively, if the latitude and longitude are represented in decimal format, the same resolution may be attained using 47 bits, with 17 extra bits to spare. Other implementations may include more bits to define the latitude and longitude information and/or increase the resolution of the geographical information. Other encoding schemes may use more or less than 49 bits to encode the geolocation information of a network device. A device may decode the geolocation information in an IPv6 address by bit masking to extract the relevant latitude and longitude bits.

In some implementations, some of the spare bits are used to represent altitude information. The number of bits dedicated to altitude information depends on the desired resolution. For instance, to represent altitudes from zero (0) to four thousand ninety-six (4096) feet, yards, etc., twelve (12) bits may be used.

The IPv6 address may encode the Media Access Control (MAC) address for the network device. The MAC address may be encoded using different bits than the geographical location information or using the same bits.

The spare bits in the Network ID segment (or a Host ID segment) may be used to further identify the network device, to encode other information, or to distinguish between multiple IP devices located within the same geographical location (e.g., network devices located within the same 10 ft by 10 ft location). For example, some of the spare bits may be used to encode a date or timestamp of when the latitude and longitude information was acquired. Another implementation may use some the spare bits to distinguish between two or more network devices having the same latitude and longitude. For instance, altitude information may be encoded in the spare bits to help distinguish between network devices having the same latitude and longitude location. Another implementation may use some of the spare bits to encode indicator of the accuracy of the latitude, longitude, and/or altitude provided.

By encoding geolocation information as part of an IPv6 address, this approach readily distributes and makes available geolocation information for network devices within a network (e.g., the Internet). As a first network device communicates with other network devices, it transmits its IPv6 address (which includes it geolocation information) to those network devices. Thus, the network devices that receive the IPv6 address for the first network device are able to readily obtain its geographical location from the IPv6 address. No special query or reporting infrastructure is needed.

Figure 2:
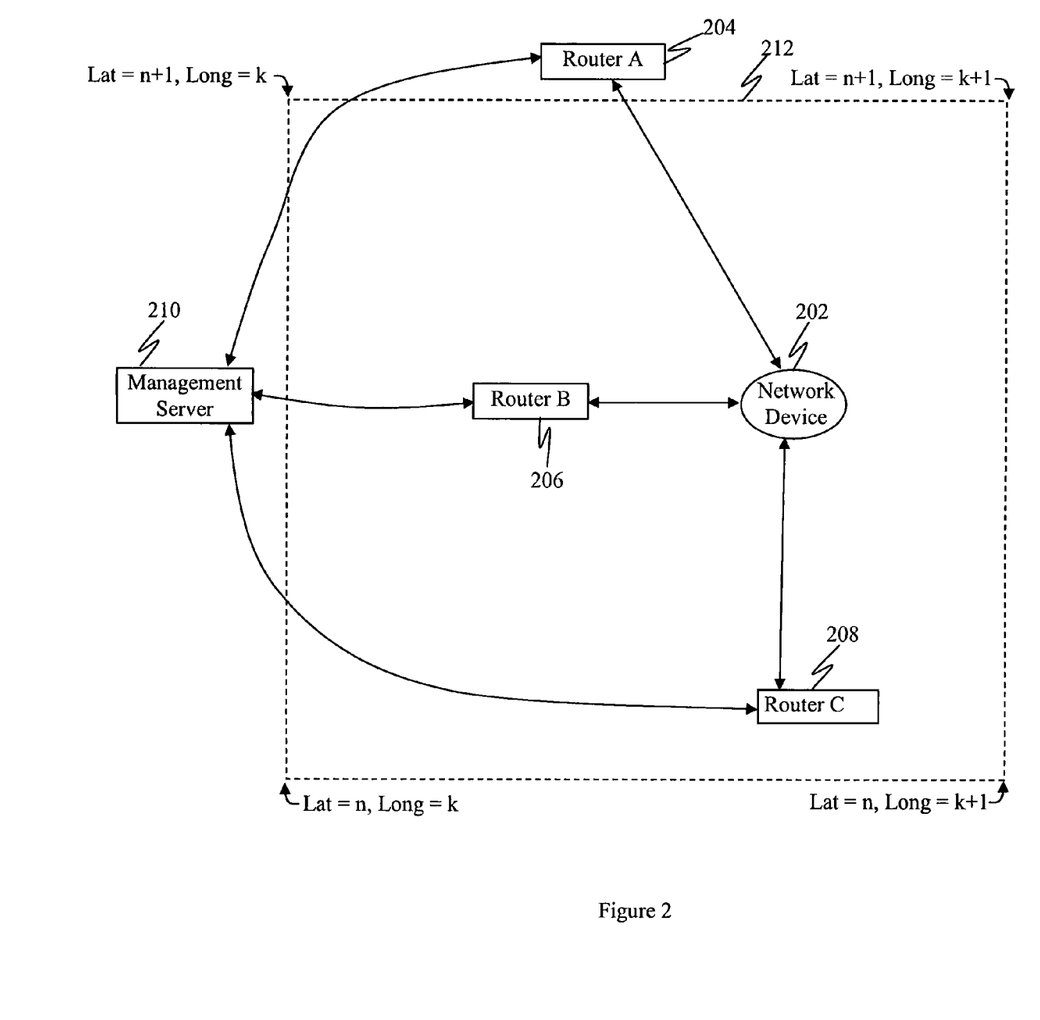
FIG. 2 illustrates how the geolocation information of a networked device may be obtained.

FIG. 2 illustrates how the geolocation information of a networked device may be obtained according to one implementation. In this example, one or more routers 204, 206, and 208 having known geographical locations are used to obtain a distance to a network device 202. The geographical location of each router 204, 206, and 208 may be configured during setup or otherwise ascertained with some precision. For example, router 204 may estimate its distance to the requesting network device based on the packet delay and the characteristics of the interface used to reach the network device (e.g., transmission speed of medium, type of physical medium: copper, fiber, wireless or others. etc.).

Network device 202 may request an IP address assignment from the communication network through which it communicates. Since a router 204, 206 or 208 in the communication network is typically close (both physically and in network hops—which should preferably be one hop) to the network device 202, this puts the router 204, 206, or 208 in an advantageous position to estimate a geographical location for network device 202. Preferably, the latency from the network device 202 should be small and not subject to large variations, and the router 204, 206, or 208 can remove other uncertainty elements, like variable propagation delay and effects of transmission delay, from the latency estimate to make it more accurate.

Having obtained a distance to network device 202, router 202 may calculate a geographical location by using its own geographical location and the distance to network device 202. Where other routers 206 and 208 having known geographical locations are available, the distance from each router is obtained and used to more precisely determine the geographical location of network device 202 by triangulation or other techniques.

In yet other implementations, network device 202 may have other mechanism, such as a GPS device, with which to obtain its own geographical location. Network device 202 can then include its geographical location when requesting an IP address from the communication network.

Having obtained a geographical location for network device 202, an IPv6 address is assigned to network device 202. The 64-bit Network ID segment of the IPv6 address may represent the network ID of the network (e.g., routers 204, 206, and/or 208) through which it communicates. The 64-bit Host ID segment of the IPv6 address may include some bits that represent the geographical location of network device 202. Alternatively, parts of the 64-bit Network ID segment may be used to represent the geographical location of network device 202 with the 64-bit Host ID segment being used to identify network and/or host information. For example, as illustrated in FIG. 1, forty-nine (49) bits are used to represent the latitude and longitude of a network device.

In various implementations, the IPv6 address of network device 202 may be assigned by a network infrastructure device, such as a router or a management server 210. The router 204, 206, or 208 or management server 210 performs IP address assignment to network device 202 based on all the known information by validating the network device 202 geographical location, if any, and assigning an appropriate address with the best available accuracy. The IPv6 address for network device 202 may also include a valid timestamp indicating the time and/or date in which the IPv6 address was assigned. In an alternative implementation, the IPv6 address of network device 202 may be self-assigned if the network device can determine its own geolocation information (e.g., using GPS sensors or through manual configuration). Network device 202 may then update or propagate its IPv6 address with the routers 204, 206, 208 and/or management server 210 using various address updating protocols.

If management server 210 is used to assign IP addresses to network devices, management server 210 may obtain the geographical position information for network device 202 from one or more routers 204, 206, and/or 208 and use it to assign an IPv6 address to network device 202. Alternatively, the routers 204, 206, and/or 208 may forward the distance estimates for the network device 202 and their own geographical location to management server 210. Management server 210 may then use triangulation to further enhance the position accuracy of network device 202.

In one example, a router or management server 210 may encode the geographical information for network device 202 into the Network ID segment and/or Host ID segment of the IPv6 address. This IPv6 address is then sent to network device 202 to use in its communications. In this manner, geolocation information can be made available to network devices, including network devices that do not have a native position determination method (e.g., embedded global positioning system) at its disposal.

Network device 202 may be a wired or wireless device that connects to a network and is identified on the network by an IP address. Examples of the network device include: mobile phones, mobile computers, desktop computers, handheld devices, personal digital assistants, VOIP modems, etc.

Another feature provides for updating the IP address of a network device to reflect a change in geographical location or movement of the network device. For example, as a network device leaves a defined region 212 (FIG. 2) or 106 (FIG. 1), its IP address is updated or modified to indicate its new geographical location. Region 212 may be defined in terms of degrees, minutes or seconds depending on the geographical position accuracy desired in an implementation.

Figure 3:
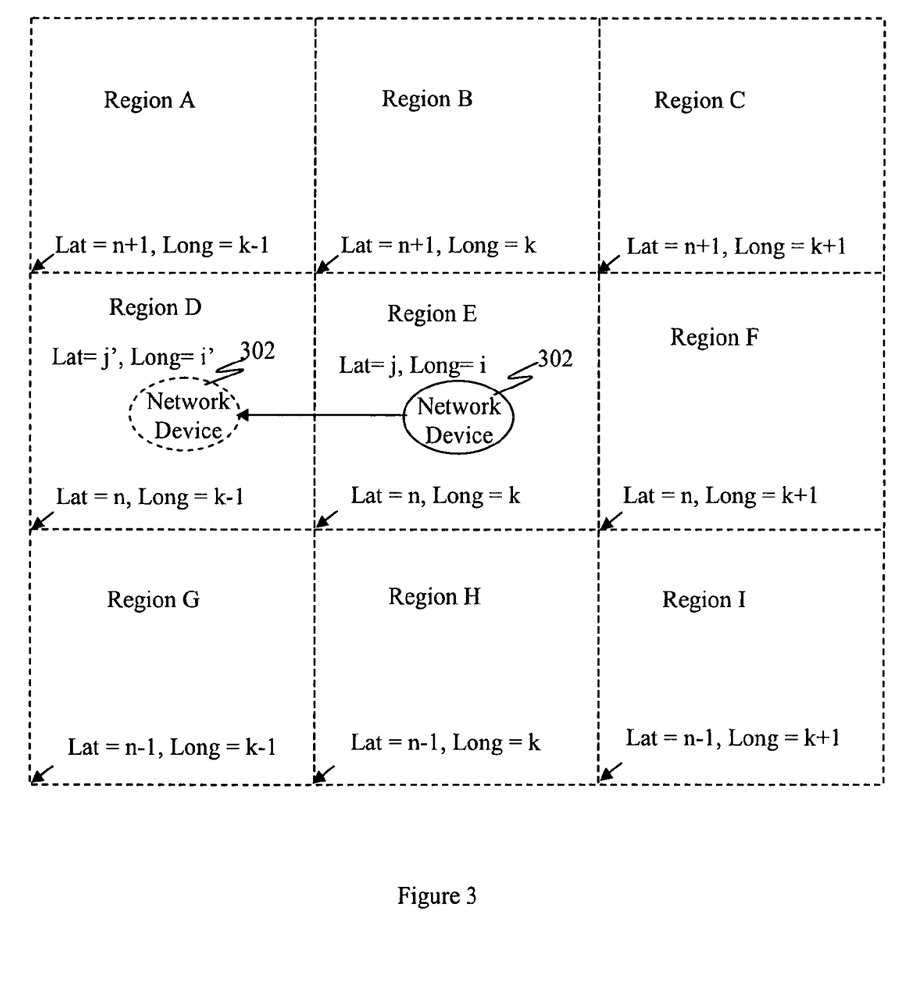
FIG. 3 illustrates how an IPv6 address may be updated as a networked devices move from one location to another.

FIG. 3 illustrates how an IPv6 address may be updated as a networked device moves from one location to another. Network device 302 may be located in a Region E which is defined as the region between Latitude=n to n+1 and Longitude=k to k+1. Network device 302 may have a geographical location of Latitude=j, Longitude=i, where n≦j≦n+1 and k≦i≦k+1. One feature provides for updating the location of network device 302 as it moves from Region E to Region D, for example. Movement of network device 302 may be detected by monitoring the distance(s) to the router(s) through which it communicates in Region E. Alternatively, as network device 302 terminates a communication link from one router and establishes a link with another router this may indicate movement of the network device and trigger a new position determination for network device 302. Thus, as network device 302 moves to an adjacent Region D, it is assigned a new IPv6 address based on its new geographical location of Latitude=j', Longitude=i', where n≦j'≦n+1 and k−1≦i'≦k.

The size of each region may be increased or decreased depending on the accuracy desired for the network device 302 location. Thus, the latitudes and longitudes defining each region may be in degrees, minutes, seconds, tenths of seconds, etc., or a combination thereof. This approach prevents the IP address of network device 302 from being updated for very small movements of network device 302. Alternatively, the system may be configured to track very small changes in the location of network device 302 and update its IP address accordingly as a way to obtain the real-time or near-real-time location of network device 302. That is, as a network device moves, its IP address or parts of its IP address is changed or modified. Similarly, an altitude for network device 302 may be represented as part of its IP address and modified as the network device moves.

In one implementation, the latitude and longitude information encoded into an IP address is arranged from most significant (e.g., degrees) to least significant (e.g., tenths of seconds) bits. When the network device moves, its IP address changes starting with the least significant bits of the latitude and/or longitude. As the network device moves further away from its original location, more significant bits (e.g. representing minutes or degrees) also change. This feature permits predicting the speed of a moving network device.

Figure 4:
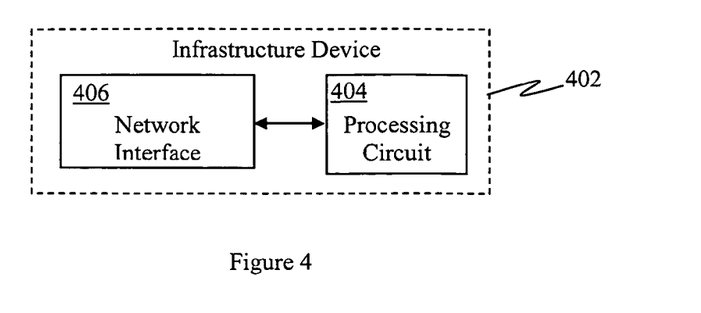
FIG. 4 is a block diagram of a processing device, such as a router and/or management server, that is configured to assign an IPv6 address encoded with the geolocation information of the network device to which it is assigned.

FIG. 4 is a block diagram of a processing device 402, such as a router and/or management server, that is configured to assign an IPv6 address encoded with the geolocation information (e.g., latitude, longitude, and/or altitude) of the network device to which it is assigned. Processing device 402 includes a processing circuit 404 coupled to a network interface 406 through which it communicates with network devices.

Figure 5:
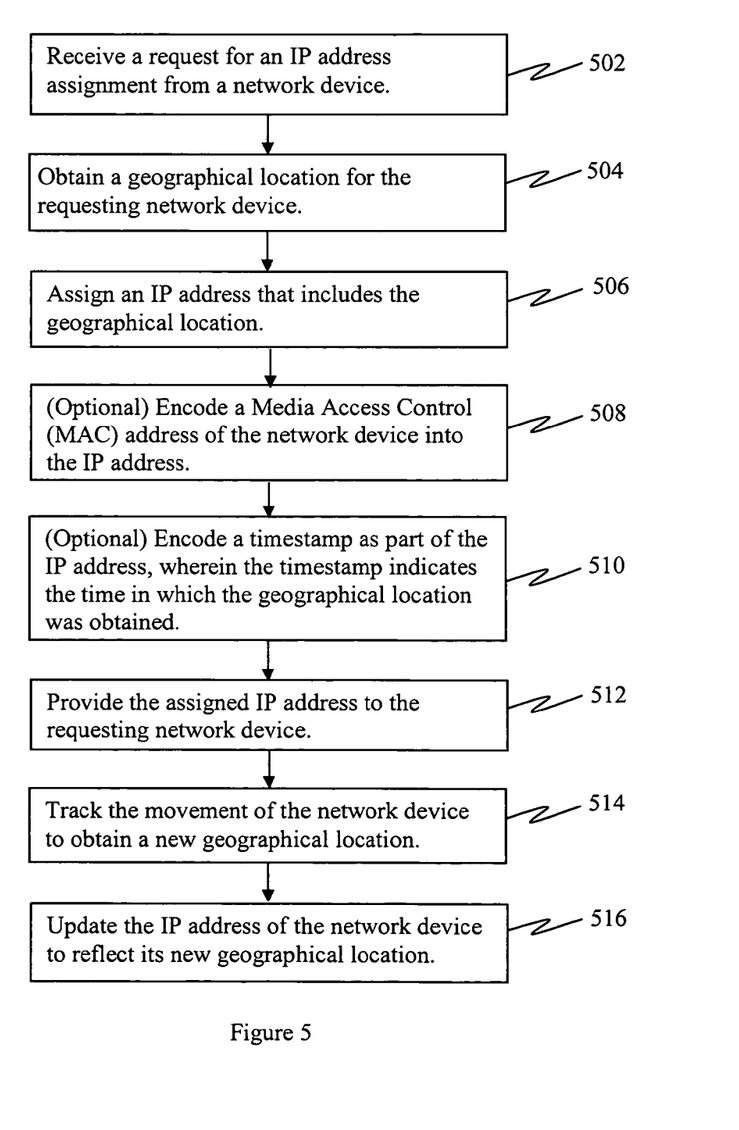
FIG. 5 illustrates a method for assigning an IP address with encoded geographical information.

FIG. 5 illustrates a method of operation of processing device 402 to assign an IP address with encoded geographical information according to one implementation. Processing circuit 404 may be configured to receive a request for an IP address assignment from a network device 502 and obtain a geographical location for the requesting network device 504. In one example, the IP address requested may be a 128-bit IPv6 address. In various implementations, processing circuit 404 may obtain the geographical location for the requesting network device from the network device itself, from network routers, or by determining a distance measurement to the requesting network device. Processing circuit 404 may be further configured assign an IP address that includes the geographical location 506, and provide the assigned IP address to the requesting network device 512. The geographical information for the network device may be encoded, for example, as part of the 64-bit Network ID segment of an IPv6 address. This geographical information may include a latitude and a longitude specified to a desired resolution (e.g., degrees, minutes, seconds, tenths of seconds, etc.).

In some implementations, a Media Access Control (MAC) address of the network device may also encoded into the IP address. Additionally, a timestamp may be encoded as part of the IP address to indicate the time in which the geographical location was obtained. This timestamp may indicate the age of the geographical location. In other implementations, date stamps may also be used to indicate the date in which the geographical location was obtained.

Additionally, processing circuit 404 may be further configured track the movement of the network device to obtain a new geographical location 514 and update the IP address of the network device to reflect its new geographical location 516. In various implementations, only the seconds, minutes, and/or degrees of the network device geographical location are updated. For example, if the network device moves only a few feet, just the 'seconds' portion of the geographical location may be updated, thereby causing a change in the IP address. Similarly, an altitude for the network device may also be encoded as part of the IP address and updated as the network device moves.

Figure 6:
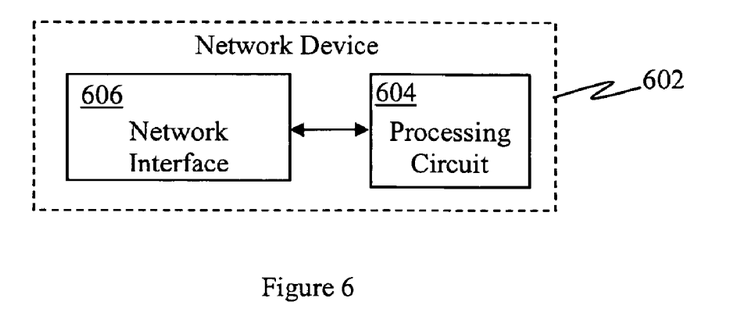
FIG. 6 is a block diagram illustrating a network device configured to extract geographical information from an IP address.

FIG. 6 is a block diagram illustrating a network device 602 configured to extract geographical information from an IP address according to one implementation. Network device 602 includes a processing circuit 604 coupled to a network interface 606 through which it communicates with network devices. Processing circuit 604 is configured to obtain a latitude, longitude, and/or altitude from an IPv6 address received via network interface 606.

Figure 7:
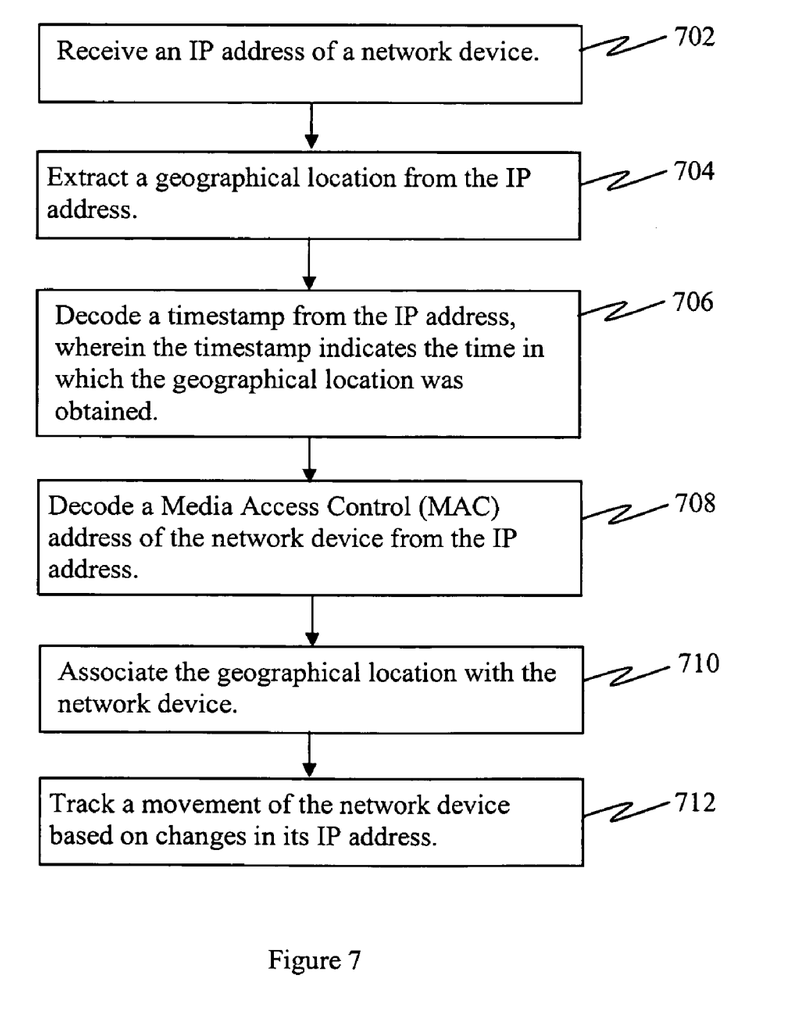
FIG. 7 illustrates a method of operation of a first network device for extracting a geographical location from an IP address of a second network device.

FIG. 7 illustrates a method of operation of a first network device 602 for extracting a geographical location from an IP address of a second network device. In one implementation, the IP address is an IPv6 128-bit address that has been derived based on the geographical location of the second network device. First network device 602 receives the IP address of the second network device 702. The IP address may be received as part of the normal course of communications between the first and second network devices. A geographical location (e.g., latitude longitude, and/or altitude) is extracted from the IP address 704. For example, predetermined portions of the IP address may be masked to extract the latitude and longitude information. In other embodiments geolocation information for network devices may be represented in different forms besides a latitude, a longitude, and/or an altitude. The extracted geographical location is associated with the second network device 710.

In some embodiments, first network device 602 is further configured to decode a Media Access Control (MAC) address of the second network device from the IP address 708. The movement of the second network device may then be tracked based on changes in its IP address 712. That is, first network device 602 may use the MAC address to associate the different IP address with the same second network device and then compare the geographical locations extracted from the IP addresses associated with the second network device to determine its movement. In some embodiments, a timestamp from the IP address is also decoded, wherein the timestamp indicates the time in which the geographical location was obtained 706.

Figure 8:
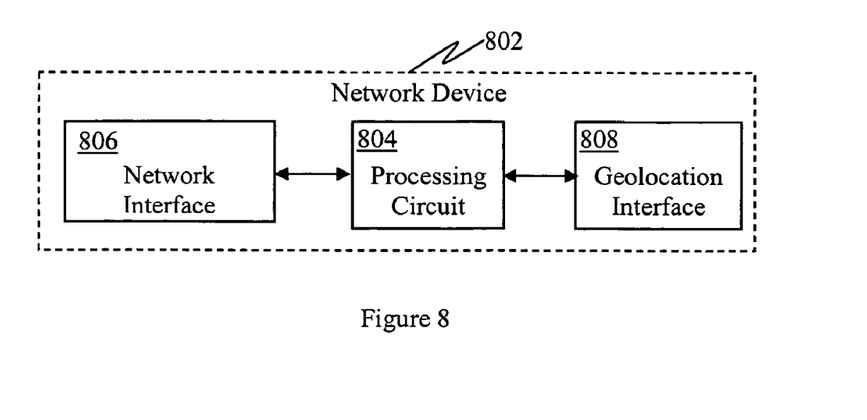
FIG. 8 is a block diagram illustrating a network device configured to self-assign an IP address based on its own geographical location information.

FIG. 8 is a block diagram illustrating a network device 802 configured to self-assign an IP address based on its own geographical location information according to one implementation. Network device 802 includes a processing circuit 804 coupled to a network interface 806 through which it communicates with network devices. Processing circuit 804 is also coupled to a geolocation interface 808 from which it can obtain its own geographical location (e.g., a latitude, longitude, and/or altitude). Geolocation interface 808 may include a GPS device, a manually configured geographical location for network device 802, and/or an interface to an external device that can provide the geographical location of network device 802. Processing circuit 804 is configured to obtain from the geographical location for network device 802 from geolocation interface 808 and generate its own IP address (e.g., IPv6 address) based on the geographical location. Once network device 802 has assigned its own IP address, processing circuit 804 may propagate its IP address to other network devices via network interface 806.

Figure 9:
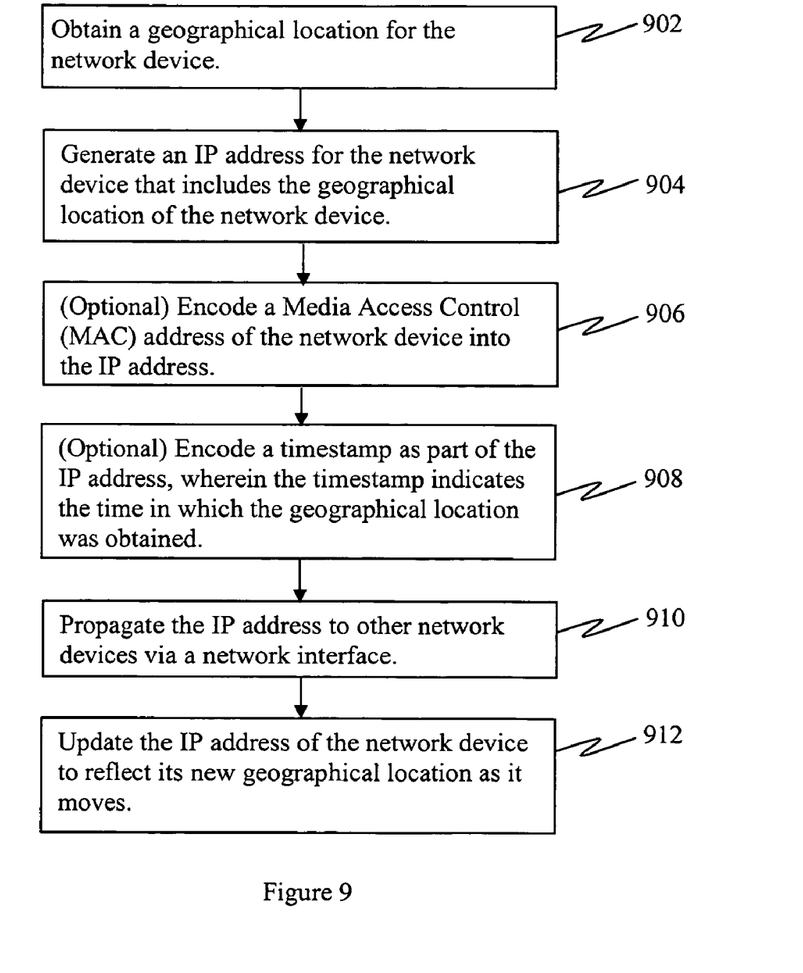
FIG. 9 illustrates a method for a network device to self-assign its own IP address based on its geographical location according to one implementation.

FIG. 9 illustrates a method for a network device to self-assign its own IP address based on its geographical location according to one implementation. The network device obtains its geographical location 902. This geographical location may be obtained from an attached GPS sensor, manually configuration into the network device, or obtained from a remote device. An IP address for the network device is then generated that includes the geographical location of the network device 904. A Media Access Control (MAC) address of the network device may be encoded into the IP address 906. A timestamp may also be encoded as part of the IP address, wherein the timestamp indicates the time in which the geographical location was obtained 908. The network device then propagates the IP address to other network devices via a network interface 910. The network device updates its IP address to reflect its new geographical location as it moves 912.

While various examples herein have described encoding geolocation information as part of the Network ID segment of an IPv6 address, the one implementation contemplates that the geolocation information may instead use the Host ID segment, or a combination of the Network ID and Host ID segments, of an IPv6 address to encode the geographical location of network devices.

One or more of the components, steps, and/or functions illustrated in FIGS. 1, 2, 3, 4, 5, 6, 7, 8 and/or 9 may be rearranged and/or combined into a single component, step, or function or embodied in several components, steps, or functions without departing from the invention. Additional elements, components, steps, and/or functions may also be added without departing from the invention. The apparatus, devices, and/or components illustrated in FIGS. 1, 2, 3, 4, 6 and/or 8 may be configured to perform one or more of the methods, features, or steps described in FIGS. 5, 7 and/or 9.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

Figure 10:
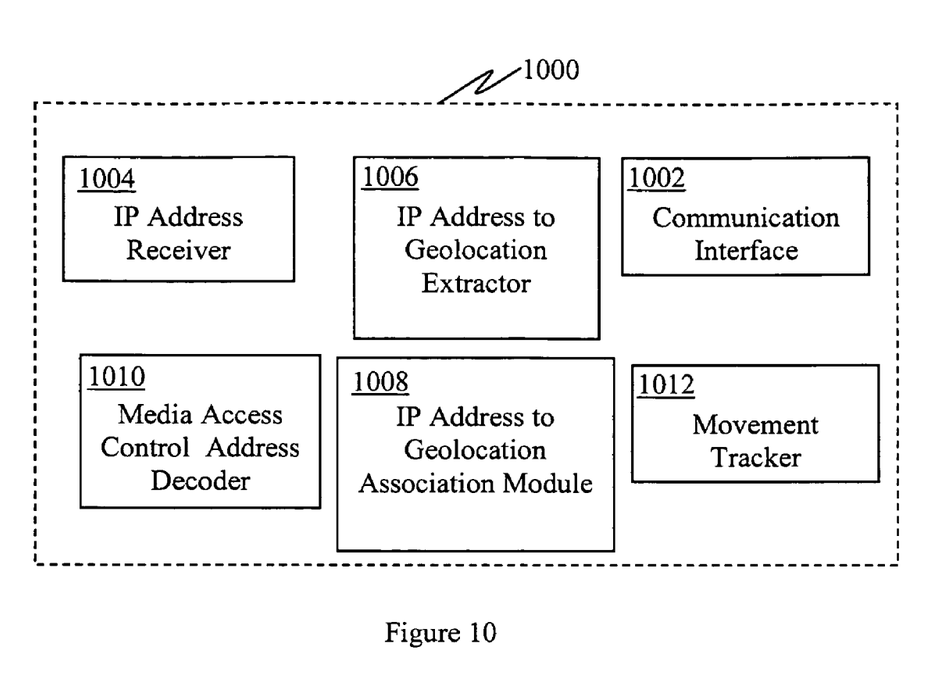
FIG. 10 illustrates yet another apparatus that obtains the geographical location of a network device by using the IP address of the network device.

It should be noted that the foregoing embodiments are merely examples and are not to be construed as limiting the invention. For example, FIG. 10 illustrates an apparatus 1000 including a communication interface 1002 configured to interface the apparatus to a communication network, an IP address receiver 1004 configured to receive an IP address of a network device, an IP address geolocation extractor 1006 configured to extract a geographical location from the IP address, and an IP address to geolocation association module 1008 configured to associate the geographic location in the IP address with the network device. The apparatus 1000 may further comprise a media access control (MAC) address decoder 1010 for decoding a Media Access Control (MAC) address of the network device from the IP address, and a movement tracker 1012 for tracking a movement of the network device based on changes in its IP address, where the changes in IP address indicate a change in the geographical location of the network device.

Accordingly, an apparatus may comprise means for interfacing the apparatus to a communication network, means for receiving an IP address of a network device, means for extracting a geographical location from the IP address, and means for associating the geographic location in the IP address with the network device. The apparatus may further comprise means for decoding a Media Access Control (MAC) address of the network device from the IP address, and means for tracking a movement of the network device based on changes in its IP address, where the changes in IP address indicate a change in the geographical location of the network device. Here, the means for interfacing may comprise communication interface 1002, the means for receiving may comprise IP address receiver 1004, the means for extracting may comprise IP address geolocation extractor 1006, and/or the means for associating may comprise IP address to geolocation association module 1008, as shown in FIG. 10.

Figure 11:
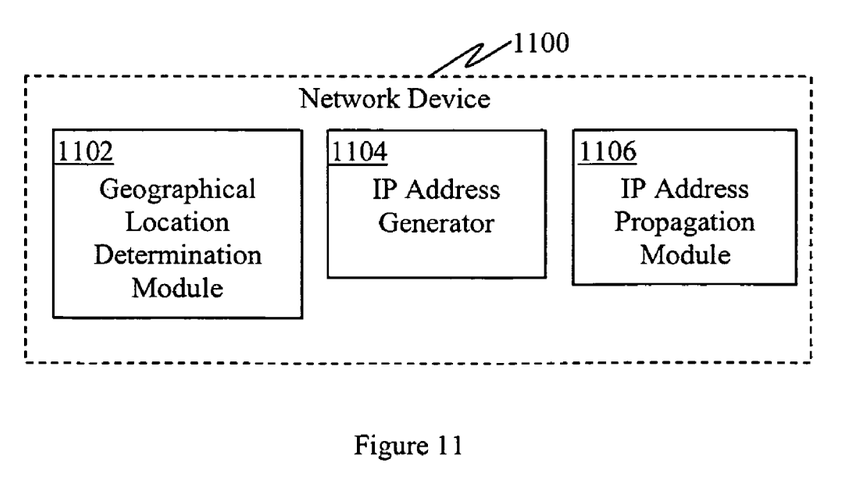
FIG. 11 illustrates a network device configured to self-assign its own IP address.

FIG. 11 illustrates an example of a network device 1100 configured to self-assign its own IP address. The network device 1100 comprises a geographical location determination module 1102 configured to obtain the geographical location for the network device, an IP address generator 1104 configured to generate an IP address for the network device that includes the geographical location of the network device, and an IP address propagation module 1106 configured to propagate the IP address of the network device to other network devices.

Accordingly, a network device configured to self-assign its own IP address, may comprise means for obtaining the geographical location for the network device, means for generating an IP address for the network device that includes the geographical location of the network device, and means for propagating the IP address of the network device to other network devices. Here, the means for obtaining may comprise geographical location determination module 1102, the means for generating may comprise IP address generator 1104, and/or the means for propagating may comprise IP address propagation module 1106, as shown in FIG. 11.

The various components described in FIGS. 10 and/or 11 may be embodied by one or more of the components previously described and/or illustrated herein. It should be noted that one or more elements of apparatus 1000 and/or network device 1100 may be rearranged and/or combined without affecting the operation of the device. Also, additional elements, components, steps, and/or functions may also be added without departing from the invention. In various implementations, one or more of the components or modules illustrated in FIG. 10 and/or 11 may be implemented as software or as part of a processor.

The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational on an infrastructure device of a communication network, the method comprising:
    receiving a request for an Internet Protocol (IP) address assignment from a network device;
    obtaining a geographical location for the network device;
    encoding a Media Access Control (MAC) address of the network device into the IP address;
    encoding the geographical location of the network device, wherein the MAC address and the geographical location are encoded into the IP address using a same plurality of bits;
    assigning an IP address that includes the geographical location and the MAC address encoded into the IP address; and
    providing the assigned IP address to the network device.

2. The method of claim 1, wherein the IP address requested is a 128-bit Internet Protocol version 6 (Ipv6) address.

3. The method of claim 1, wherein the geographical location is obtained by determining a distance from a network router having a known geographical location to the network device.

4. The method of claim 1, wherein the geographical location is obtained from one or more other infrastructure devices.

5. The method of claim 1, wherein the geographical location is obtained from the requesting network device.

6. The method of claim 1, wherein the geographical location includes at least one of either a latitude, longitude, or altitude.

7. The method of claim 1, further comprising:
    encoding a timestamp as part of the IP address, wherein the timestamp indicates a time at which the geographical location was obtained.

8. The method of claim 1, further comprising:
    tracking a movement of the network device to obtain a new geographical location; and
    updating the IP address of the network device to reflect the new geographical location of the network device.

9. The method of claim 1, wherein encoding the Media Access Control (MAC) address of the network device into the IP address comprises embedding the MAC address of the network device within the IP address.

10. An apparatus comprising:
    a network interface adapted to couple the apparatus to a communication network; and
    a processing circuit coupled to the network interface and adapted to:
        receive a request for an Internet Protocol (IP) address assignment from a network device through the network interface;
        obtain a geographical location for the network device;
        assign an IP address that includes the geographical location, and a Media Access Control (MAC) address of the network device integrated into the IP address, wherein the processing circuit is further adapted to integrate the MAC address and the geographical location into the IP address using a same plurality of bits; and
        provide the assigned IP address to the network device through the network interface.

11. The apparatus of claim 10, wherein the processing circuit is further adapted to encode a timestamp as part of the IP address, wherein the timestamp indicates a time at which the geographical location was obtained.

12. The apparatus of claim 10, wherein the processing circuit is further configured to:
    track a movement of the network device to obtain a new geographical location; and
    update the IP address of the network device to reflect the new geographical location of the network device.

13. The apparatus of claim 10, wherein integrating the Media Access Control (MAC) address of the network device into the IP address is performed by encoding the Media Access Control (MAC) address into the IP address.

14. The apparatus of claim 10, wherein the IP address requested is a 128-bit Internet Protocol version 6 (Ipv6) address.

15. A device comprising:
    means for receiving a request for an Internet Protocol (IP) address assignment from a network device;
    means for obtaining a geographical location for the network device;
    means for assigning an IP address of the network device, wherein the IP address includes the geographical location of the network device, and an encoded Media Access Control (MAC) address of the network device, wherein the geographical location and the MAC address of the network device are encoded into the IP address of the network device using a same plurality of bits; and
    means for providing the assigned IP address to the network device.

16. The device of claim 15, further comprising:
    means for tracking a movement of the network device to obtain a new geographical location; and means for updating the IP address of the network device to reflect the new geographical location of the network device.

17. A non-transitory machine-readable medium having one or more instructions for assigning an Internet Protocol (IP) address which, if executed by a processor, causes the processor to:
receive a request for an IP address assignment from the network device;
obtain a geographical location for the network device;
embed a Media Access Control (MAC) address of the network device into the IP address, wherein the MAC address of the network device and the geographical location of the network device are embedded in the IP address using a same plurality of bits; and
assign the IP address.

18. The non-transitory machine-readable medium of claim 17, having one or more instructions, which, if executed by the processor, cause the processor to:
track a movement of the network device to obtain a new geographical location; and
update the IP address of the network device to reflect the new geographical location of the network device.

19. The non-transitory machine-readable medium of claim 17, having one or more instructions, which, if executed by the processor, causes the processor to:
embed the Media Access Control (MAC) address of the network device into the IP address of the network device by distributing bits of the MAC addresses throughout one or more portions of the IP address.

20. A method for obtaining a geographical location for a network device, the method comprising:
receiving an Internet Protocol (IP) address of the network device;
decoding a Media Access Control (MAC) address of the network device from the IP address, wherein a plurality of bits indicative of the MAC address are interspersed in the IP address;
extracting a geographical location from the IP address, wherein the MAC address of the network device and the geographical location were encoded into the IP address using a same plurality of bits; and
associating the extracted geographic location in the IP address with the network device.

21. The method of claim 20, wherein the IP address received is a 128-bit Internet Protocol version 6 (Ipv6) address.

22. The method of claim 20, further comprising:
decoding a timestamp from the IP address, wherein the timestamp indicates a time at which the geographical location was obtained.

23. The method of claim 20, further comprising:
tracking a movement of the network device based, at least, on changes in IP address, wherein the changes in IP address indicate a change in the geographical location of the network device.

24. An apparatus comprising:
a network interface to couple the apparatus to a communication network; and
a processing circuit coupled to the network interface and adapted to:
receive an Internet Protocol (IP) address of a network device;
extract a geographical location from the IP address, wherein the geographical location is obtained by determining a distance from a network router having a known geographical location to the network device, and wherein the geographical location is embedded in the IP address using a same plurality of bits with which a Media Access Control (MAC) address is embedded in the IP address; and
associate the extracted geographic location from the IP address with the network device.

25. The apparatus of claim 24, wherein the IP address received is a 128-bit Internet Protocol version 6 (Ipv6) address.

26. The apparatus of claim 24, wherein the processing circuit is further adapted to:
decode Media Access Control (MAC) address of the network device from the IP address; and
track a movement of the network device based, at least, on changes in the IP address, wherein the changes in the IP address indicate a change in the geographical location of the network device.

27. A network device configured to self-assign an Internet Protocol (IP) address of the network device, the network device comprising:
a network interface adapted to couple the network device to a communication network;
a geolocation interface adapted to provide a geographical location for the network device; and
a processing circuit coupled to the network interface and to the geolocation interface, the processing circuit adapted to:
obtain the geographical location for the network device from the geolocation interface;
generate an IP address of the network device that includes the geographical location of the network device and a Media Access Control (MAC) address of the network device, the geographical location of the network device and the MAC address of the network device being included only in a network identification portion of the IP address, and the geographical location and the MAC address of the network device being included in a same plurality of bits of the network identification portion of the IP address; and
propagate the IP address of the network device to other network devices via the network interface.

28. The network device of claim 27, wherein the processing circuit is further adapted to encode a timestamp as part of the IP address, the timestamp indicating a time at which the geographical location was obtained.

29. A network device configured to self-assign an Internet Protocol (IP) address of the network device, the network device comprising:
means for obtaining a geographical location for the network device;
means for generating an IP address of the network device that includes the geographical location of the network device and the MAC address of the network device, the geographical location of the network device and the MAC address of the network device being included only in a host identification portion of the IP address, and the geographical location and the MAC address of the network device being included in a same plurality of bits of the host identification portion of the IP address; and
means for propagating the IP address of the network device to other network devices.

30. A method for self-assigning an Internet Protocol (IP) address by a network device, the method comprising:
obtaining a geographical location of the network device;
generating the IP address of the network device that includes the geographical location of the network device and the MAC address of the network device, the geographical location of the network device and the MAC address of the network device being included only in a portion of the IP address that identifies a network with which the network device is associated, and the geographical location and the MAC address of the network device being included in a same plurality of bits of the portion of the IP address that identifies the network with which the network device is associated; and propagating the IP address of the network device to other network devices via the network interface.

31. The method of claim 30, further comprising:
updating the IP address of the network device to reflect a new geographical location as the network device moves.

* * * * *